United States Patent [19]

De Ward et al.

[11] 4,241,401
[45] Dec. 23, 1980

[54] VIRTUAL ADDRESS TRANSLATOR UTILIZING INTERRUPT LEVEL CODE

[75] Inventors: Robert C. De Ward, Burnsville; David G. Kaminski, Eagan; Mickiel P. Fedde, Apple Valley, all of Minn.

[73] Assignee: Sperry Corporation, New York, N.Y.

[21] Appl. No.: 861,798

[22] Filed: Dec. 19, 1977

[51] Int. Cl.³ .................. G06F 9/32; G06F 13/00; G11C 9/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,675,215 | 7/1972 | Arnold et al. | 364/200 |
| 3,761,881 | 9/1973 | Anderson et al. | 364/200 |
| 3,761,883 | 9/1973 | Alvarez et al. | 364/200 |
| 3,781,808 | 12/1973 | Ahearn et al. | 364/200 |
| 3,825,904 | 7/1974 | Burk et al. | 364/200 |
| 3,829,840 | 8/1974 | Burk et al. | 364/200 |
| 3,839,706 | 10/1974 | Borchsenius | 364/200 |
| 3,854,126 | 12/1974 | Gray et al. | 364/200 |
| 3,866,183 | 2/1975 | Lange | 364/200 |
| 3,902,164 | 8/1975 | Kelley et al. | 364/200 |
| 3,909,798 | 9/1975 | Wallach et al. | 364/200 |
| 3,938,100 | 2/1976 | Steiner | 364/200 |
| 4,004,278 | 1/1977 | Nagashima | 364/200 |
| 4,038,645 | 7/1977 | Birney et al. | 364/200 |
| 4,053,948 | 10/1977 | Hogan et al. | 364/200 |
| 4,084,226 | 4/1978 | Anderson et al. | 364/200 |
| 4,087,856 | 5/1978 | Attanasio | 364/200 |
| 4,093,986 | 6/1978 | Bodner et al. | 364/200 |
| 4,096,573 | 6/1978 | Heller et al. | 364/200 |

*Primary Examiner*—Melvin B. Chapnick
*Attorney, Agent, or Firm*—John L. Rooney; Kenneth T. Grace; Marshall M. Truex

[57] ABSTRACT

Apparatus for use within a virtual memory data processing system offering a way of protecting data used at one interrupt level state from unauthorized use at another interrupt level state. A virtual memory data processing system permits a computer program to specify relative (or virtual) addresses rather than physical (or real) addresses. Most practical virtual memory data processing systems utilize a Virtual Address Translator (VAT), often called a Directory Look-Aside Table (DLAT). The VAT contains a plurality of internal conversion tables which perform virtual address to real address translation. A binary code, called the Interrupt Level Code (ILC), is appended to the virtual address of entries within the plurality of internal conversion tables within the VAT to permit the VAT to translate virtual addresses to real addresses only if the present Central Processing Unit (CPU) interrupt level state corresponds to the interrupt level state denoted by the ILC within the VAT. This prohibits the VAT from translating virtual addresses to real addresses at one interrupt level state based upon entries within the plurality of internal conversion tables entered to translate virtual addresses to real addresses at a different interrupt level state.

3 Claims, 11 Drawing Figures

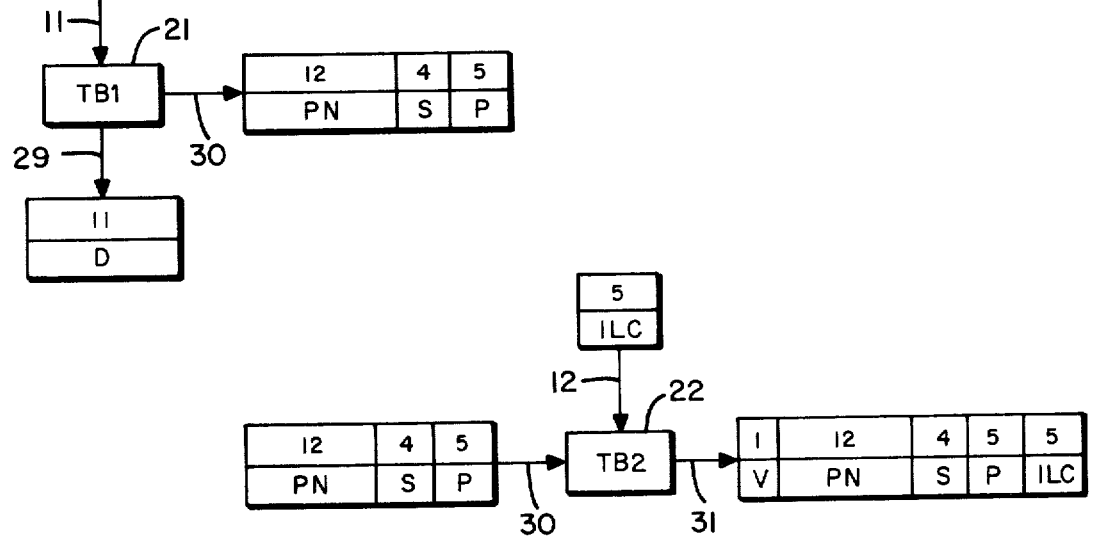
Fig. 4a
Fig. 4b
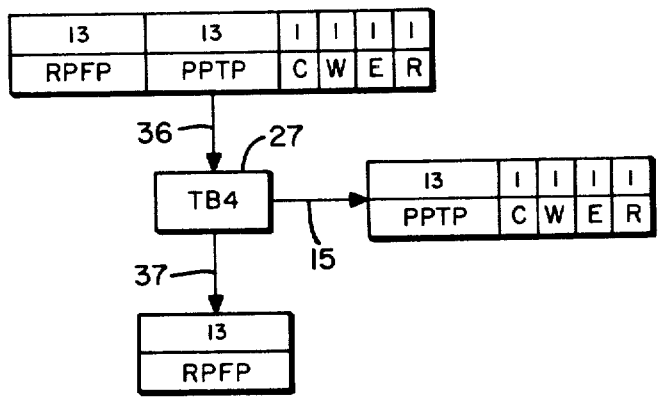
Fig. 4c
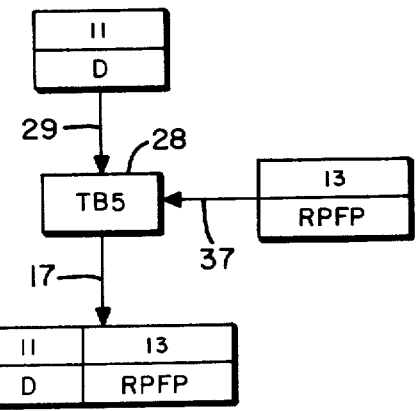
Fig. 4d

VIRTUAL ADDRESS TRANSLATOR UTILIZING INTERRUPT LEVEL CODE

BACKGROUND OF THE INVENTION

This invention relates generally to digital computer systems and more particularly to such systems utilizing a virtual address translator (VAT) for converting a virtual address to a real address.

It is well known in the art that hierarchical memory systems provide an effective means for accommodating the large storage requirements of modern data processing systems within the constraint of economic feasibility. Basically, a hierarchical memory system utilizes a combination of relatively small, fast, and expensive main memory (real memory) for access by one or more Central Processing Units (CPU's), along with relatively large, slow, and inexpensive on-line mass storage. Because a CPU can directly access only real memory, its addressing structure must be designed to interface in terms of real addresses. The computer programs and data base elements which utilize the data processing system hardware, of course, occupy more storage capacity than is available within real memory. Therefore, at all times, some data are stored within real memory and other data are resident within mass storage. Furthermore, the composition of which data are in real memory and the addresses for these data must vary with time to permit the data processing system to perform all of its tasks within a reasonable measure of efficiency. The consequence of having no permanent real memory location or address for an individual data element means that such data element must be accessed by a CPU using a real address which varies over time.

The early art required the individual programmer to incorporate the logic within his computer programs to determine whether an individual data element is or is not in real memory, and if it is, at what real address. This requirement proved most confusing to many programmers and resulted in gross inefficiencies in the generation and utilization of computer programs. The present art uses the concept of virtual memory which permits the programmer to write computer programs without being concerned with when and where his computer program elements will reside within real memory. The concept permits him to assume a memory structure based upon virtual addressing and to refer to each datum within his computer program through the use of a virtual address. In this manner, a virtual address once assigned by the programmer does not change as the program is run in the data processing system. The data processing system is then left with the responsibility of translating the virtual address used by the computer program to reference a data element into a real address within real memory to provide the required interface between the CPU and real memory.

Various schemes have been proposed to accomplish the virtual address to real address translation. Currently, the most popular technique is to divide a computer program into segments which correspond to the types of data within the computer program (e.g., instructions, constants, variables, and program outputs). These segments are further divided into pages which are of a convenient fixed length to permit ease of transfer between directly addressable real memory and mass storage media. The term page is commonly used to refer to a page within a computer program or the amount of real memory required to store a page of a computer program. To distinguish between the two concepts when necessary, the former will be called a virtual page and the latter will be referred to as a real page. The location of a byte within a page (virtual or real) may be defined as the displacement within that page or the number of that byte position when numbering each byte position within the page. A byte within virtual memory may then be defined by providing the displacement within a virtual page, the location of that virtual page within a segment, and the computer program (or process) containing that segment. A byte within real memory may be defined by providing the displacement within a real page and the location of that real page within real memory. The virtual address to real address translation problem becomes the translating of a virtual page (within a segment, within a process) designation to a real page designation. The displacement is the same for both the virtual address and the real address.

The initial virtual address systems utilized software translation. It was found, however, that the use of special purpose hardware in the form of a Virtual Address Translator (VAT), or Directory Look Aside Table (DLAT) as is sometimes found in the art, greatly enhanced system throughput. The VAT contains internal conversion tables which provide rapid translation to real page designations of the most recently used virtual page designations. As various computer programs (or processes) utilize the CPU, new VAT entries are established replacing previous VAT entries. Prior art teaches various methods for determining when a VAT entry should be replaced with a new VAT entry. Donald B. Bennett, et al, in U.S. Pat. No. 4,096,568, teach the creation of a new VAT entry whenever a VAT miss occurs. This is a convenient method because the VAT entry is simply created simultaneously with the required software virtual address to real address translation. It was found that individual real memory accesses needed no memory protection function if the VAT was used, because the memory protection check was made at the time the VAT entry was established and subsequent translations fell within the perimeter of that protection. An additional speed enhancement was realized when no memory protection check was needed. A problem occurred, however, because of the multiple interrupt level states of CPU's. Certain memory accesses may be permitted in one interrupt level state and not another. The present art teaches that this problem is overcome by a purging (or replacing all entries) of the VAT whenever the interrupt level state is changed. This provides the desired memory protection, but it also causes a great deal of inefficiency as a CPU changes from one interrupt level state to another and back again.

The instant invention maintains the desired memory protection function while obviating the need to purge the VAT as the CPU changes from one interrupt level state to another.

SUMMARY OF THE INVENTION

In accordance with the present invention, a unique binary code, Interrupt Level Code (ILC), is used for each interrupt level state permitted in a CPU. At the time a VAT entry is generated, the ILC corresponding to the current interrupt level state is appended to the virtual page designator within the VAT to produce a VAT entry containing the process name, the segment designator, the virtual page number, and the ILC. Each time a real memory access is attempted through the VAT, the process name, the segment designator, and the virtual page are transferred to the VAT from the CPU along with the ILC representing the present interrupt level state of the CPU. To complete the virtual address to real address translation, the VAT requires congruity of not only the virtual page designator (i.e., process name, segment designator, and virtual page) but also the ILC in the VAT entry and the ILC representing the present interrupt level state of the CPU. Therefore, permissible access to a real page in one interrupt level state does not permit access in another interrupt level state until such time as a software virtual address to real address translation is made, the VAT entry is made for the new (present) interrupt level state, and the memory protection check has been made.

BRIEF DESCRIPTION OF THE DRAWINGS

FIG. 4a illustrates the routing of the elements of the virtual address by the VAT element TB1.

FIG. 4b illustrates the routing of the ILC and the virtual page descriptor by the improved VAT element TB2.

FIG. 4c illustrates the routing of the contents of one addressable location of RAM 26 by VAT element TB4.

FIG. 4d illustrates the routing of the real address by VAT element TB5.

DETAILED DESCRIPTION OF THE PREFERRED EMBODIMENT

The description of the preferred embodiment assumes a data processing system which uses a 24-bit real address, permits byte access to real memory, and has a basic data word width of 32 bits. It is readily recognized by those skilled in the art that these represent rather common architectural parameters and were chosen for that reason. The disclosed embodiment has 32 interrupt level states (expressible with 5-bit ILC) defined. It is apparent that the present invention is applicable to virtual memory data processing systems, however, which have different architectural parameters.

Figure 1:
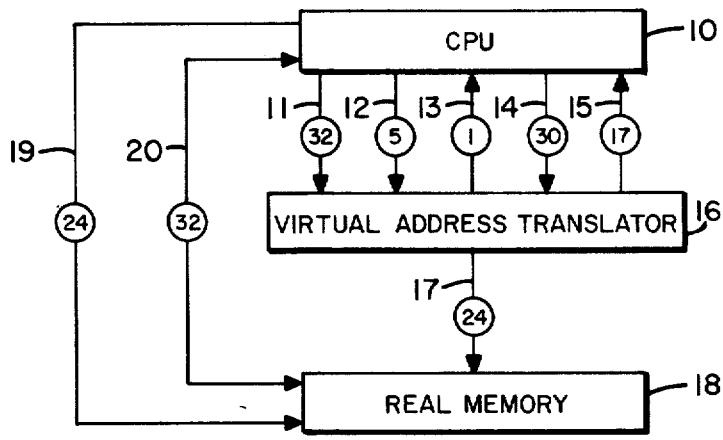
FIG. 1 shows a conceptual data processing system utilizing a Central Processing Unit (CPU), a Virtual Address Translator, and a real memory.

The basic position of VIRTUAL ADDRESS TRANSLATOR 16 within a virtual memory data processing system is shown in FIG. 1. VIRTUAL ADDRESS TRANSLATOR 16 provides an interface between CPU 10 and REAL MEMORY 18. Each time the computer program running in CPU 10 requires a memory reference, CPU 10 transfers a 32-bit virtual address to VIRTUAL ADDRESS TRANSLATOR 16 via line 11. It simultaneously transmits a 5-bit ILC via line 12 which identifies the present interrupt level state of CPU 10. The generation and uses of an ILC to define interrupt level state is commonly taught. See for example the teaching of Anthony M. Whitby, et al, in U.S. Pat. No. 3,988,719 at column 5, lines 13 through 25 wherein ILC is stored within level identifying register 57 and supplied via output 58. Similarly, Raoul Sajeva, in U.S. Pat. No. 3,940,745, teaches the use of priority level (i.e., interrupt level state) stored within control unit 27 and supplied via wires 30, 31, and 32. VIRTUAL ADDRESS TRANSLATOR 16 compares the virtual page designator from the virtual address received along with the ILC to the entries stored within its internal conversion tables.

If a match is not found, VIRTUAL ADDRESS TRANSLATOR 16 notifies CPU 10 of the lack of a match via line 13 and CPU 10 must compute the real address by accessing control tables stored within REAL MEMORY 18. These accesses are implemented via lines 19 and 20 with CPU 10 transferring the address of the control tables via line 19 and receiving the data via line 20. The computation of the real address in this manner has been known in the art for some time so a detailed explanation will not be provided herein. Once CPU 10 has computed the real address, CPU 10 transfers it to VIRTUAL ADDRESS TRANSLATOR 16 via line 14 for subsequent use as taught by Bennett, et al, in U.S. Pat. No. 4,096,568.

Should VIRTUAL ADDRESS TRANSLATOR 16 find a match on the virtual address received from CPU 10 via line 11, it translates that virtual address into a real address which is presented to REAL MEMORY 18 via line 17. REAL MEMORY 18 locates the corresponding data word and transfers it to CPU 10 via line 20. VIRTUAL ADDRESS TRANSLATOR 16 upon finding a match between the virtual address presented and the corresponding real address located within its internal conversion tables also transfers real memory access data back to CPU 10 via line 15. This real memory access data includes those quantities needed by CPU 10 to verify real memory access through the translation just accomplished in VIRTUAL ADDRESS TRANSLATOR 16.

Figure 2:
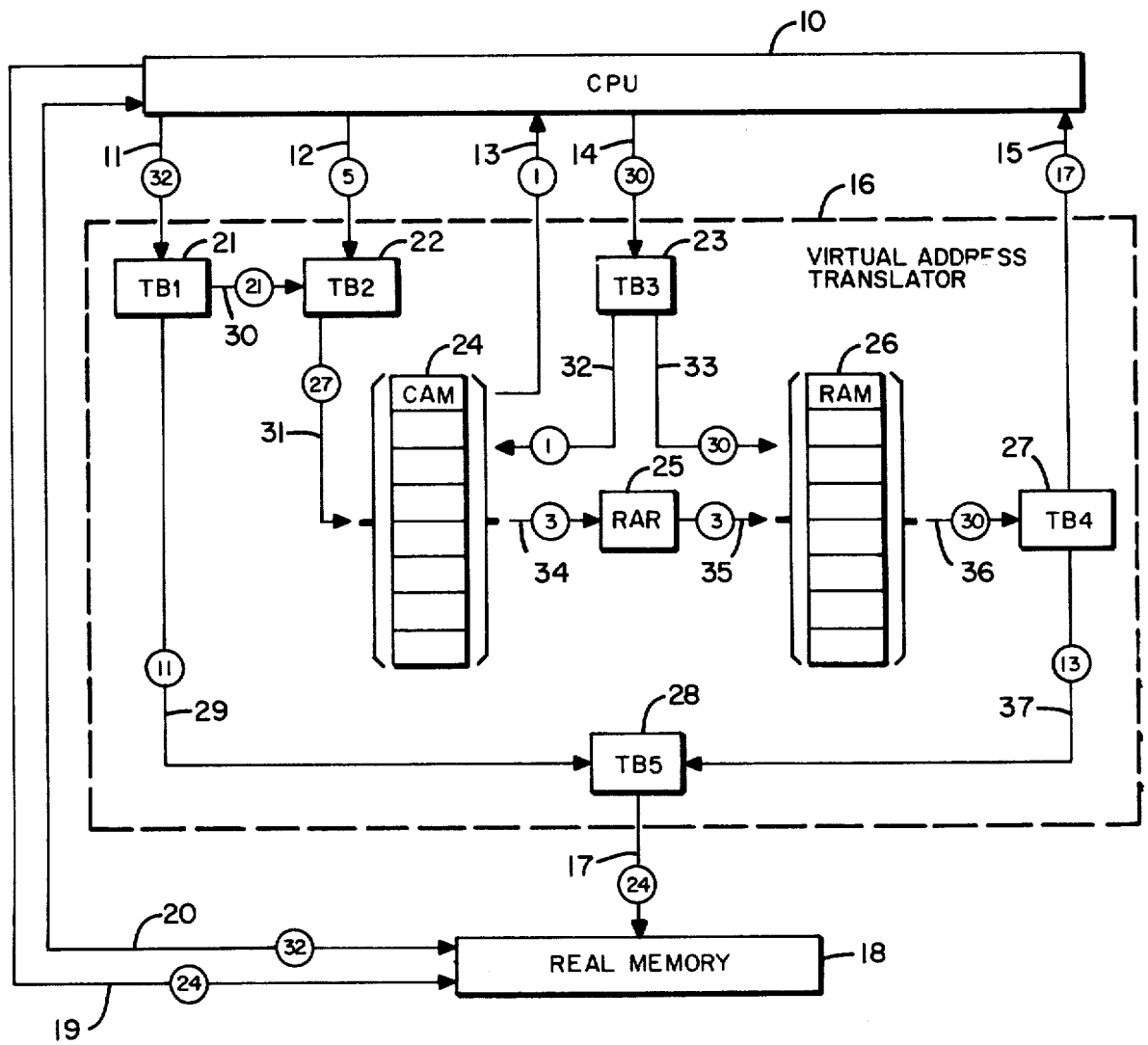
FIG. 2 provides a detailed illustration of the improved VAT and its interfaces.
Figure 3A:
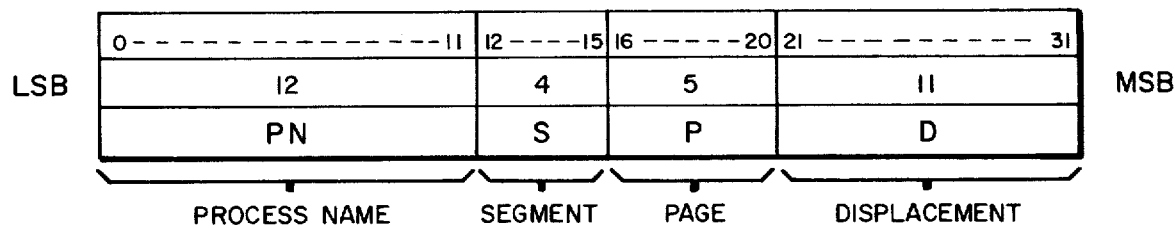
FIG. 3a illustrates the format of a Virtual Address.

FIG. 2 provides a detailed illustration of the operation of VIRTUAL ADDRESS TRANSLATOR 16. CPU 10 transfers a virtual address via line 11 to Terminal Block 1 (a mere electrically wired connection branch), TB1 21, within VIRTUAL ADDRESS TRANSLATOR 16 to initiate a memory reference. The virtual address is a 32-bit quantity whose format is depicted in FIG. 3a. Contained therein is:

(1) the Process-Name (or logical name of the computer program requesting the memory access);

(2) the segment designator (as defined above);

(3) the page number within the segment; and (4) the displacement or location of the desired byte (or bytes) within the selected page.

Referring to FIG. 2, it can be seen that TB1 21 route the virtual address as two elements. The 11-bit displacement is transferred to Terminal Block 5 (a mere electrically wired connection branch), TB5 28, 28 via line 29 and the remainder of the virtual address is transferred as a 21-bit quantity to Terminal Block 2 (a mere electrically wired connection branch), TB2 22 via line 30. FIG. 4a illustrates the routing of the displacement and virtual page descriptor elements of the 32 bit virtual address by TB1 21. TB1 21 receives the 32-bit virtual address containing fields PN (Process Name), S (Segment Designator), P (Page Number), and D (Displacement) via line 11 and routes the various fields as shown. TB1 21 transfers the displacement (Field D) via line 29 and the virtual page designator (fields PN, S, and P) via line 30.

Figure 3B:
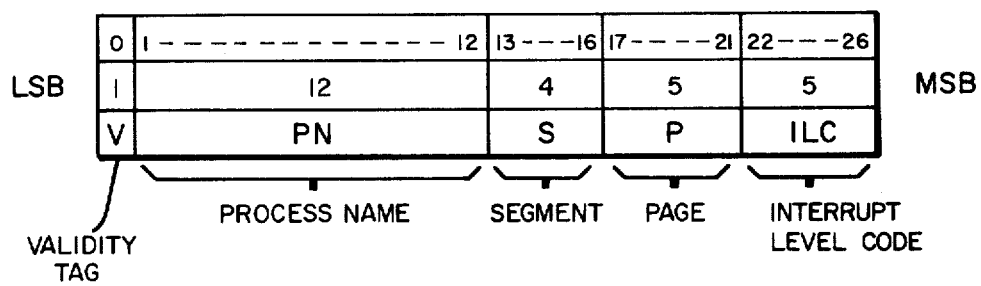
FIG. 3b illustrates the format of an improved VAT Content Addressable Memory (CAM) entry.

As is illustrated in FIG. 2, the 21-bit virtual page designator is transferred to TB2 22 via line 30. At the time it transfers the virtual address via line 11, CPU 10 also transfers a 5-bit Interrupt Level Code (ILC) via line 12 which identifies the present one interrupt level state of CPU 10 of the 32 which are defined. The function of TB2 22 is to route these two data elements to content addressable memory, CAM 24, via line 31. The format of the quantity sent to CAM 24 is shown in FIG. 3b. The virtual page designator is found in bit positions $2^1$-$2^<$. The interrupt level code occupies bit positions $2^{22}$-$2^{26}$. Bit position $2^0$ is a single bit validity tag which is always set to a binary one by TB2 22 upon access to CAM 24. The routing of data by TB2 22 is further illustrated in FIG. 4b. TB2 22 receives the virtual page designator via line 30 and the interrupt level code (ILC) via line 12 and concatenates them which along with the validity tag becomes the data quantity transferred via line 31.

Figure 2A:
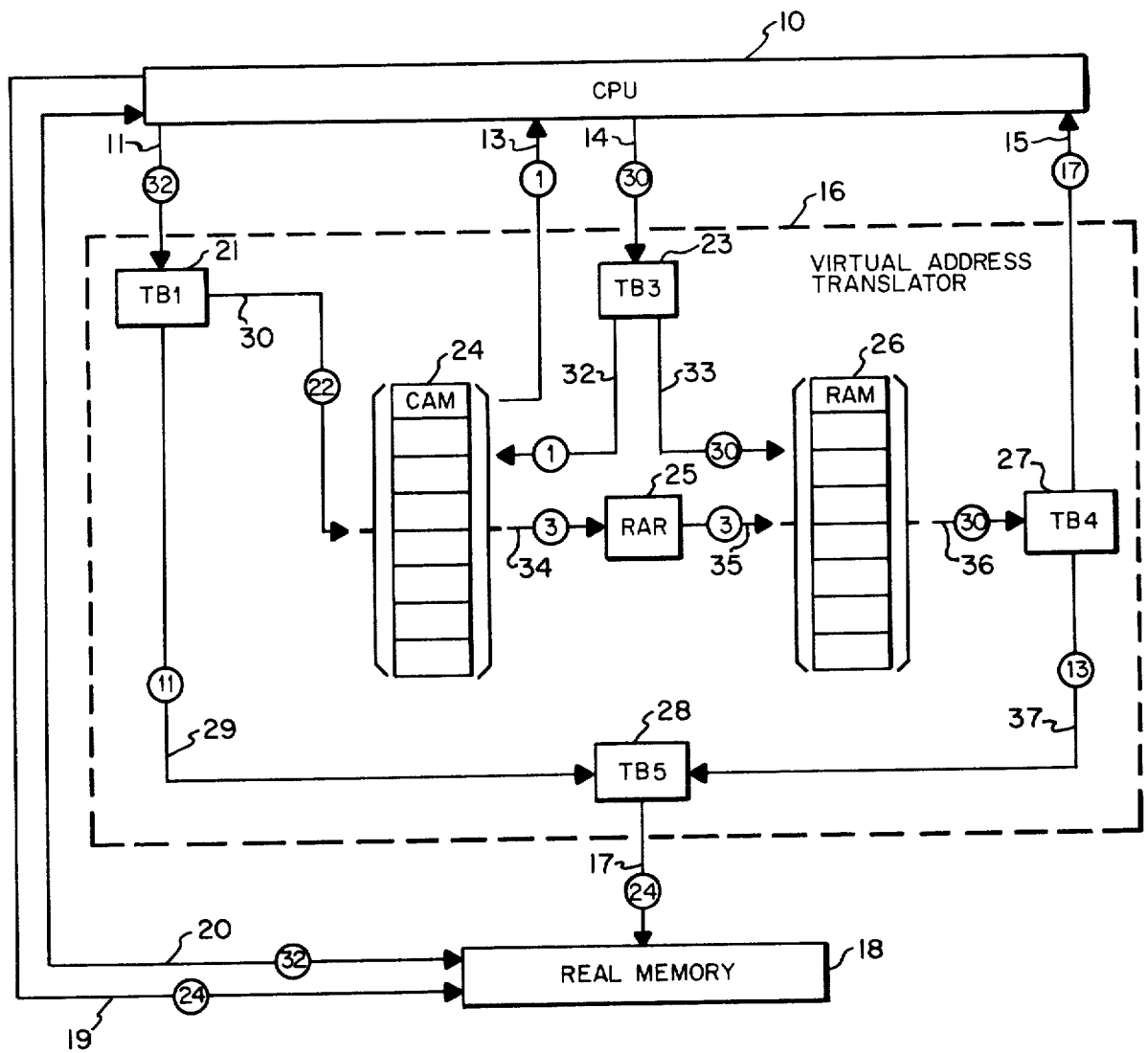
FIG. 2a provides a detailed illustration of the corresponding prior art Virtual Address Translator and its interfaces.

FIG. 2a shows a prior art VIRTUAL ADDRESS TRANSLATOR 16. For a more detailed explanation of the prior art VIRTUAL ADDRESS TRANSLATOR 16, please refer to U.S. Pat. No. 4,084,226 issued to Anderson, et al, and U.S. Pat. No. 4,096,568 issued to Bennett, et al, both assigned to the assignee of the present invention. A comparison of FIGS. 2 and 2a shows that the present invention adds element TB2 22 to the prior art structure, adds line 12 to transfer ILC from CPU 10, and transfers a 26 bit quantity rather than a 22 bit quantity to CAM 24, which is increased by five bit positions. The remaining structure of the present invention (in FIG. 2) and the prior art (in FIG. 2a) are the same as shown.

FIG. 2 illustrates the 27-bit interface between TB2 22 and CAM 24 via line 31. In the disclosed embodiment, CAM 24 is a contact addressable or associative memory having eight cells of 27 bits each. It is important that unlike the prior art Virtual Address Translator 16 (see FIG. 2a), the present invention requires CAM 24 to contain sufficient bit positions to store ILC (i.e., five bit positions in this case). It can be seen, however, that CAM 24 may have more or fewer cells in another embodiment. Signetics Part Number 10155 is typical of such a content addressable memory. It is the function of CAM 24 to compare the 27-bit quantity received of TB2 22 via line 31 against the 27-bit quantities in each of its eight cells (See FIG. 2). Notice that this compares the five bit positions corresponding to ILC, as well as, the 22 bit positions corresponding to the virtual page designator and validity tag as found in the prior art. If an exact match is found between the 27-bit quantity received via line 31 and the 27-bit quantity in any one of the eight cells within CAM 24, a 3-bit address is generated which corresponds to the address or location within CAM 24 of the 27-bit cell for which the match was received. This 3-bit address is sent via line 34 to random access memory address register, RAR 25, which is a register used to hold the 31-bit address for accessing the corresponding one of eight cells within random access memory, RAM 26.

Figure 3C:
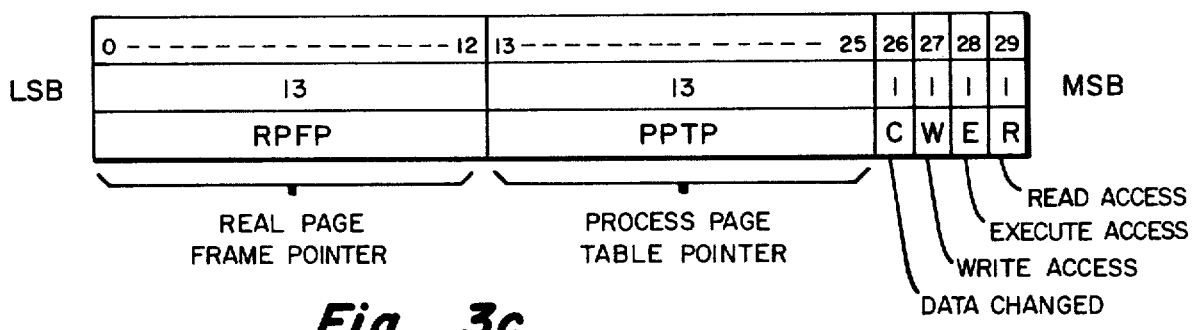
FIG. 3c illustrates the format of a VAT Random Access Memory (RAM) entry.

RAM 26 is a random access semiconductor memory containing eight cells of 30 bits each within the disclosed embodiment although more or fewer cells may be used in another embodiment, providing there remains a one-for-one corresponding between cells within RAM 26 and cells within CAM 24. Motorola Part Number 10145 is typical of such a random access semiconductor memory. Upon being accessed by RAR 25 via line 35, RAM 26 transfers the contents of the addressed cell to Terminal Block 4 (a mere electrically wired connection branch), TB4 27, via line 36. The cell so accessed with RAM 26 and its data transferred via line 36 correspond directly to the one of eight cells within CAM 24 and its contents which exactly matched the virtual page designator and the ILC transferred from CPU 10. It is through this process that the translation of a virtual address to a real address is effected. The format of the 30-bit quantity transferred is shown in FIG. 3c. This 30-bit quantity contains:

(1) a 13-bit real page frame pointer (RPFP) which is the location in REAL MEMORY 18 of the virtual page being accessed;

(2) a 13-bit process page table pointer (PPTP) which is the location in REAL MEMORY 18 of the virtual address to real address translation tables for this process;

(3) a 1-bit data change tag (C) indicating whether the data within this virtual page has been changed subsequent to its being located within the present real page;

(4) a 1-bit write access tag (W) indicating whether the process within CPU 10 should be permitted to write into this page;

(5) a 1-bit execute access tag (E) indicating whether the process within CPU 10 should be permitted to execute the data stored within this page; and (6) a 1-bit read access tag (R) indicating whether the process within CPU 10 should be permitted to read the data stored within this page.

As shown in FIG. 2, TB4 27 receives this 30-bit quantity from RAM 26 via line 36. TB4 27 routes this 30-bit quantity as the 13-bit real page frame pointer (RPFP) which is sent to TB5 28 via line 37 and a 17-bit access identifier which is sent to CPU 10 via line 15. The routing by TB4 27 is further illustrated in FIG. 4c, the entire 30-bit quantity accessed from RAM 26 is received by TB4 27 via line 36. The 13-bit real page frame pointer (RPFP) is transferred via line 37. The remainder may be termed the access identifier which is transferred to CPU 10 via line 15. The access identifier contains the process page table pointer (PPTP), the data change tage (C), the write access tage (W), the execute access tage (E), and the read access tage (R). The access identifier is utilized by CPU 10 to verify that the current process is attempting an authorized access of the requested virtual address.

Figure 3D:
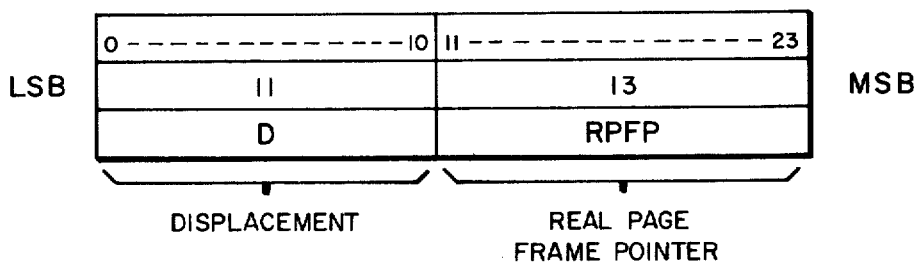
FIG. 3d illustrates the format of a real address.

FIG. 2 shows that TB5 28 concotenates the 11-bit displacement received from TB1 21 via line 29 and the 13-bit real page frame pointer (RFFP) received from TB4 27 via line 37 which form the 24-bit real address transferred to REAL MEMORY 18 via line 17. The format of this real address is shown in FIG. 3d. It contains the 11-bit displacement and the 13-bit real page from pointer. FIG. 4d illustrates the function of TB5 28. It receives the displacement (D) via line 29 and the real page frame pointer via line 37 and concotenates them into a real address which is transferred via line 17.

Referring to FIG. 2, the condition will be discussed wherein a match is not found by CAM 24 between the 27-bit quantity received from TB2 22 via line 31 and any of the eight 27-bit quantities within its eight storage cells. If a match is not found, CAM 24 notifies CPU 10 via line 13 that a match has not been found and CPU 10 initiates a virtual address to real address translation via lines 19 and 20 using the conversion tables stored within REAL MEMORY 18. This translation is, of course, more time consuming than would be expected using VIRTUAL ADDRESS TRANSLATOR 16 (both occurrences). Should CPU 10 desire to utilize VIRTUAL ADDRESS TRANSLATOR 16 (both occurrences) to make the virtual address to real address translation for subsequent references to this virtual page, it may transfer a 30-bit quantity via line 14 to Terminal Block 3 (a mere electrically wired connection branch), B3 23, to be loaded into RAM 26. The format of this quantity is found in FIG. 3c and is as previously discussed. This entry into RAM 26 corresponds to the real page frame pointer and access identifier of the virtual address access attempted. Upon receipt of this entry by TB3 23 via line 14, TB3 23 notifies CAM 24 via line 32 that the 27-bit data quantity presented by TB2 22 via line 31 is to be written into one of the eight cells of CAM 24 and the 3-bit address of that cell is to be transferred via line 34 to RAR 25. Notice that the 27-bit data quantity written into the one of the eight cells of CAM 24 contains the 5-bit ILC representing the current interrupt level state (i.e., interrupt level state of CPU 10 at the time of loading of CAM 24). Therefore, the entry being made to VAT 16 can be used for virtual to real address transition only when CPU 10 is in the current interrupt level state. Upon receipt of the 3-bit address RAR 25 addresses one of the eight cells within RAM 26 via line 35. The 30-bit quantity received by TB3 23 via line 14 is transferred to RAM 26 via line 33. That 30-bit quantity is written into RAM 26 in the one of the eight cells addressed by RAR 25 via line 35. In this manner, CPU 10 may cause VIRTUAL ADDRESS TRANSLATOR 16 to be changed to permit it to translate other virtual addresses to real addresses than are presently within its internal conversion tables (i.e., eight cells of CAM 24 and eight cells of RAM 26).

What is claimed is:

1. In a data processing system
which includes a central processing unit capable of operation in one of a plurality of interrupt level states and having an addressing means providing virtual addresses, and which also includes a memory unit with a plurality of locations each addressable by a real address, the improvement comprising:
means responsively coupled to said central processing unit and said memory unit for translating virtual addresses to real addresses for addressing said memory unit having a plurality of internal conversion tables which are loaded by said central processing unit to enable said translating means to translate virtual addresses to real addresses wherein said translating means makes such translation in response to a request from said central processing unit to access said memory unit at a real address corresponding to a virtual address generated by said addressing means;
means responsively coupled to said central processing unit and said plurality of internal conversion tables for transferring a binary code representing said permitted interrupt level state to said plurality of internal conversion tables;
means responsively coupled to said transferring means and said plurality of internal conversion tables for storing said binary code representing said permitted interrupt level state wherein said storing means stores said binary code whenever said plurality of internal conversion tables are loaded by said central processing unit;
means responsively coupled to said storing means for accessing said binary code representing said permitted interrupt level state;

means responsively coupled to said accessing means and said central processing unit for determining whether said binary code representing said permitted interrupt level state corresponds with said one of said plurality of interrupt level states of said central processing unit wherein said determining means makes such determination concurrently with the translation by said translating means of said virtual address to said real address; and
means responsively coupled to said determining means and said translating means for inhibiting the translation of said virtual address to real address within said means for translating virtual addresses to real addresses if said determining means determines that said binary code representing said permitted interrupt level state does not correspond with said interrupt level state of said central processing unit.

2. In a data processing system having a central processing unit capable of operation in one of a plurality of interrupt level states wherein each one of said plurality of interrupt level states is identifiable through the use of a different one of a plurality of interrupt level codes and wherein said central processing unit is programmable through the execution of a series of software instructions and wherein said central processing unit contains an addressing means which generates virtual addresses in response to said execution of said series of software instructions, and having a memory unit with a plurality of addressable locations wherein a one of said plurality of addressable locations may be written into and read from through the use of a corresponding one of a plurality of real addresses, and having a virtual address translator containing an internal conversion table wherein a plurality of conversion table entries can perform conversion of virtual addresses to real addresses and wherein said central processing unit loads each of said plurality of conversion table entries into said internal conversion table, the improvement comprising:
means responsively coupled to each of said plurality of conversion table entries for storing a one of said interrupt level codes;
means responsively coupled to said central processing unit and said storing means for loading said storing means with one of said plurality of interrupt level codes corresponding to one of said plurality of interrupt level states to be permitted to utilize a corresponding one of said plurality of conversion table entries concurrently with the loading by said central processing unit of said corresponding one of said plurality of conversion table entries into said internal conversion table; and
means responsively coupled to said central processing unit, said storing means, and said plurality of conversion table entries for prohibiting a one of said plurality of conversion table entries from converting virtual addresses to real addresses if the one of said plurality of interrupt level codes stored within said storing means corresponding to said one of said plurality of conversion table entries does not correspond to the one of said plurality of interrupt level states in which said central processing unit is currently operating, whereby said prohibiting means performs such prohibiting concurrently with conversion by said virtual address translator of virtual addresses to real addresses.

3. A data processing system according to claim 2 wherein said storing means and said prohibiting means further comprises:
a content addressable memory.